Sept. 25, 1956  J. B. ARMITAGE ET AL  2,764,067
MACHINE TOOL TRANSMISSION MECHANISM
Filed June 7, 1947  4 Sheets-Sheet 2

INVENTORS
Joseph B. Armitage &
Frank Zankl
BY W. D. O'Connor
Attorney

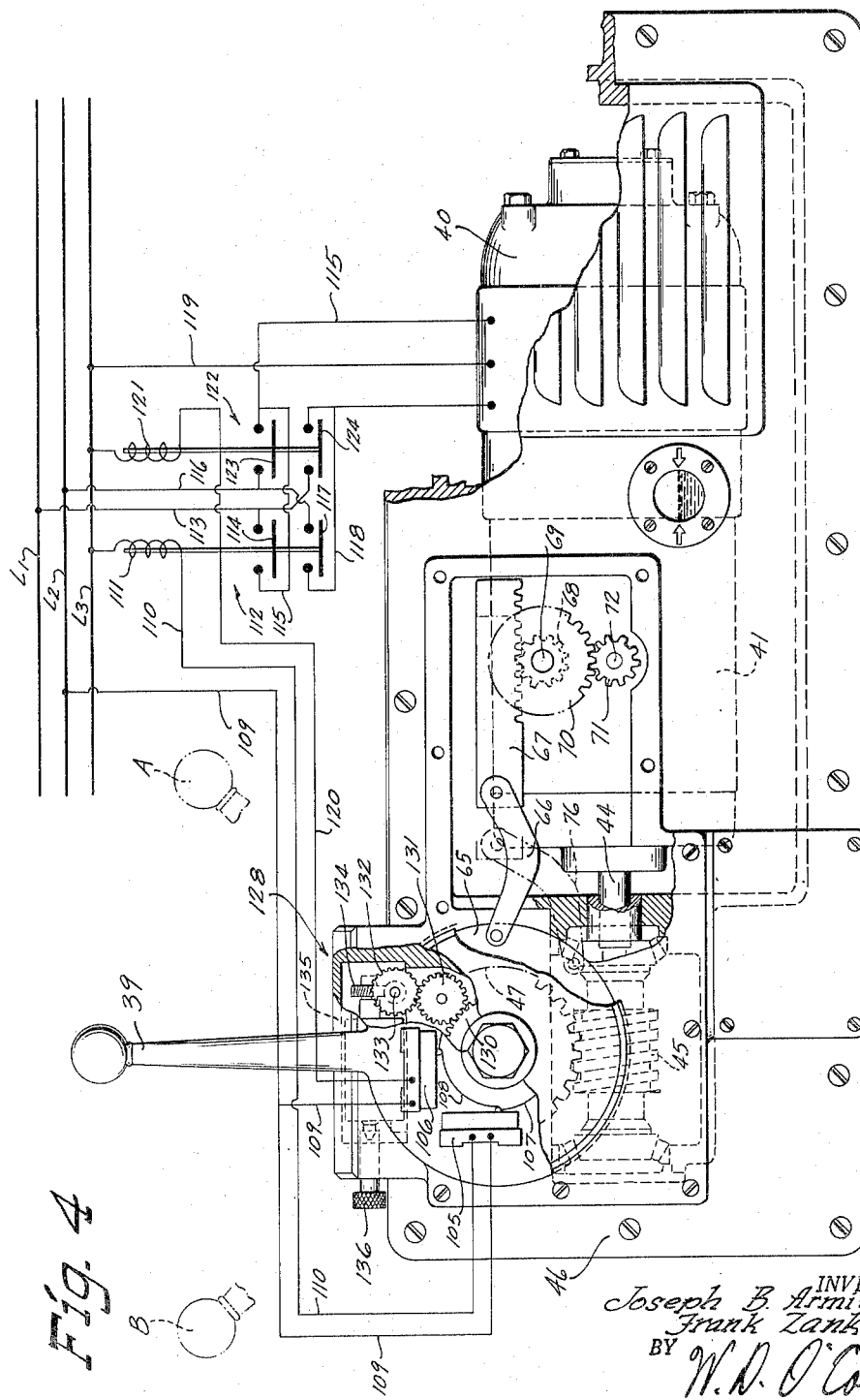

United States Patent Office 2,764,067
Patented Sept. 25, 1956

2,764,067
MACHINE TOOL TRANSMISSION MECHANISM

Joseph B. Armitage, Wauwatosa, and Frank Zankl, Milwaukee, Wis., assignors to Kearney & Trecker Corporation, West Allis, Wis., a corporation of Wisconsin Application June 7, 1947, Serial No. 753,258

13 Claims. (Cl. 90—21)

This invention relates, generally, to machine tools, and more particularly to power transmission mechanism especially adapted to effect adjusting movements of a machine tool element under manual control.

In the conventional type of machine tool, a manually operated crank mechanism is adapted to provide a means of precisely positioning a tool member for setup purposes and otherwise. This arrangement requires considerable effort and time on the part of the operator. With the invention herein disclosed, it is possible to reduce these factors to a minimum by providing a manually controlled, auxiliary power drive mechanism to move the tool member selectively.

A general object of this invention is to provide an improved power actuated adjusting mechanism for a movable element of a machine tool.

Another object of the invention is to provide a machine tool having a movable power-driven, work supporting element with a secondary driving and positioning mechanism.

Another object of the invention is to provide an improved auxiliary drive mechanism for moving a machine tool element by power under manual control.

Another object is to provide an auxiliary drive mechanism for a machine tool movable element that is especially adapted to be controlled manually for effecting controlled movement of a machine element at any rate of movement throughout a wide speed range.

Still another object of the invention is to provide a secondary drive mechanism for effecting selective positioning movement of a machine tool member, including a variable speed power source, a selectively operable clutch mechanism and a single lever control means to control the rate and direction of movement of the movable member.

Another object is to provide a manually controlled machine tool adjusting mechanism in which a single control lever is arranged to control the direction and rate of movement of a machine tool member through movement of the lever in a selected direction from a neutral position.

Another object is to provide an improved apparatus for effecting adjusting movements of a machine tool element wherein a single control lever may be actuated to effect movement of the element in either direction at a rate infinitely adjustable from relatively rapid movement to extremely slow movement for final precise positioning.

Another object is to provide a machine tool having a manually controlled infinitely variable auxiliary positioning drive mechanism whereby a movable element of the machine may be advanced toward a selected position at rapid rate and the rate of movement reduced by a smoothly decelerating action to a very slow rate for final positioning movement under manual control.

Still another object of the invention is to provide a secondary drive and positioning mechanism for effecting controlled movement of a machine tool member, with a linear movement indicating mechanism disposed to permit movement of the member to be readily read from the indicating mechanism.

Another object is to provide an auxiliary power driven adjusting mechanism for a movable element of a machine tool in which a single control lever may be moved in either direction from a neutral position to effect movement of the machine element in corresponding direction at a speed which increases in proportion to the distance of movement of the lever from neutral.

Another object of the invention is to provide a slidably mounted member of a machine tool with a primary transmission drive mechanism to effect power movement of the member during an operating cycle, and a secondary transmission drive mechanism for use to predeterminately position the member in setting up the operating cycle of the member.

Another object of the invention is to provide a primary and secondary transmission drive mechanism for effecting power movement of a machine tool member, together with an automatic control mechanism to prevent the operation of the secondary drive mechanism while the primary drive mechanism is engaged for operation.

According to this invention, a machine tool is provided with an auxiliary power operated drive mechanism for effecting adjusting movements of a movable member whereby the member may be moved in either direction at any selected rate within a wide range under sensitive manual control. To this end, there is provided an auxiliary drive mechanism including an infinitely variable speed selecting transmission device that may be coupled selectively to drive the element. A single control lever is arranged to effect adjustment of the infinitely variable speed device from zero speed to maximum in proportion to its movement in either direction from a central neutral position, the actuating linkage being arranged to provide a very gradual or delicate adjustment in the low speed range for precise positioning of the element by manual control under guidance of indicating instruments. Movement of the control lever in the one or the other direction from neutral position, actuates electrical switches for energizing a driving motor to actuate the transmission for movement in the one or the other direction. Another control arrangement effects disconnection of the auxiliary drive mechanism from the element moving mechanism when the control lever is in neutral position. Conversely, an interlocking control is provided to prevent coupling the auxiliary drive to the movable member when the main driving mechanism of the machine is engaged for operation. By means of this arrangement, the machine operator is enabled to advance a machine element in either direction toward a final position under sensitive manual control, whereby he may reduce the rate of movement from a rapid approach rate, gradually to an extremely slow final positioning rate and then stop the movement precisely at a predetermined position, as indicated by sensitive measuring instruments.

The foregoing and other objects of the invention which will become more fully apparent from the following detailed specification, may be achieved by means of the particular milling machine constituting an exemplifying embodiment of the invention which is depicted in and described in connection with the accompanying drawings in which:

Fig. 4 is a fragmentary view in vertical section, taken substantially along the plane of the line 4—4 in Fig. 2 and showing the operating lever and the multiple control mechanisms connecting therewith, together with a schematic diagram of the electrical control circuit.

Figure 1:
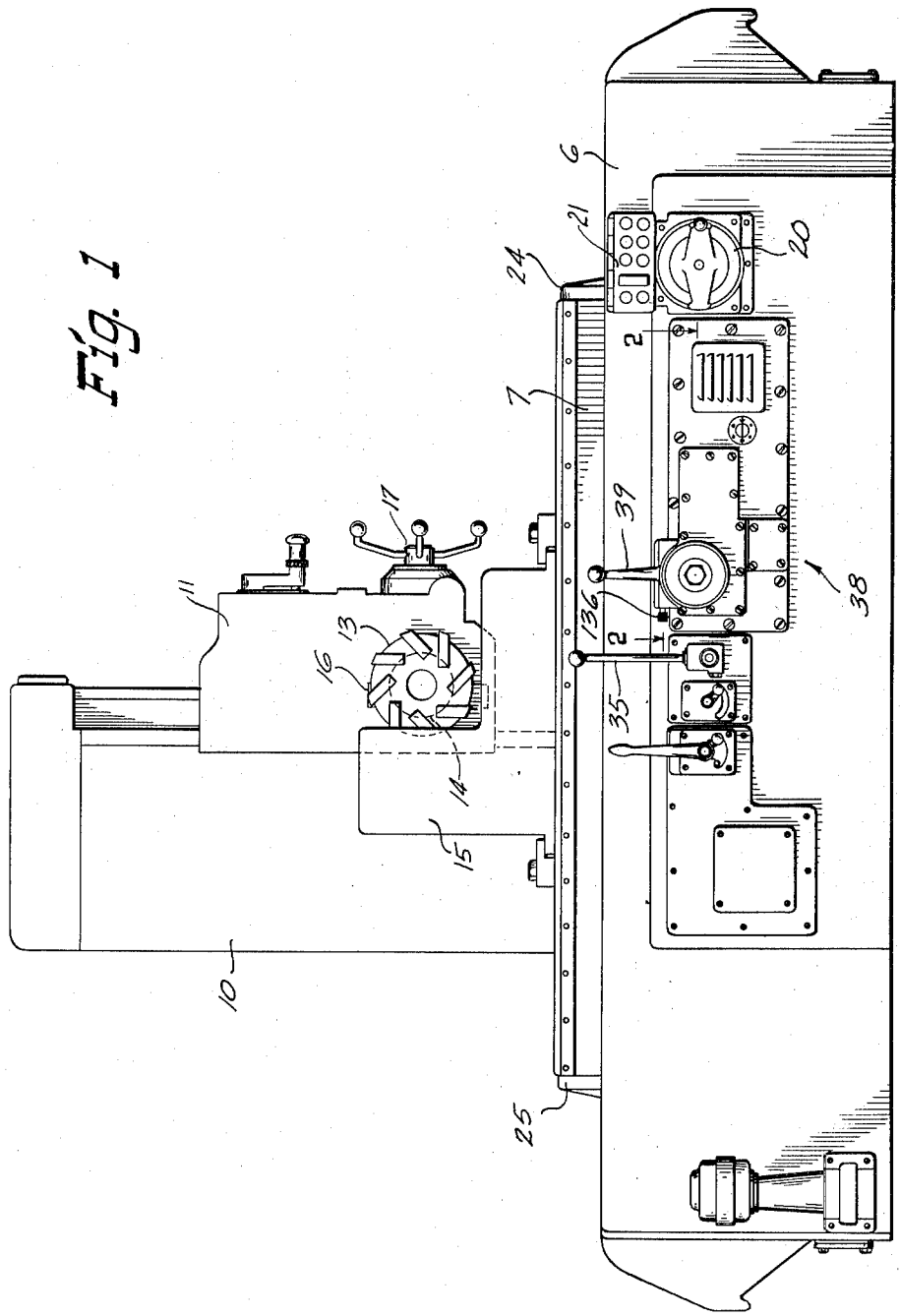
Figure 1 is a front elevational view of a milling machine provided with an auxiliary table driving mechanism in accordance with the present invention.

The particular machine tool illustrated in the drawings, into which the secondary drive mechanism embodying the present invention has been built, is a milling machine of the bed type, similar in general form and arrangement of parts to the milling machine shown in U. S. Patent No. 2,407,913, which issued on September 17, 1946.

Referring more specifically to Fig. 1 of the drawings, the milling machine there shown comprises essentially a hollow bed or base 6 which serves as a supporting frame for the machine and encloses the driving and controlling mechanism therefor. A table 7 is slidably mounted for longitudinal reciprocating movement on a pair of way surfaces 8 and 9 formed on the upper face of the bed 6. An upright column 10 attached to the rear side of the base 6, supports a tool head 11 for slidable vertical movement in positioning a cutter 13 rotatably carried by a power driven spindle 14 mounted in the head 11. To provide axial adjustment of the cutter 13 relative to a workpiece 15 clamped to the top face of the table 7, the spindle 14 is rotatably mounted in a quill 16 adjustably mounted within the tool head 11. Selective axial adjustment of the quill 16 and the cutter 13 is effected by means of a star handwheel and dial mechanism 17, in a well known manner.

Figure 2:
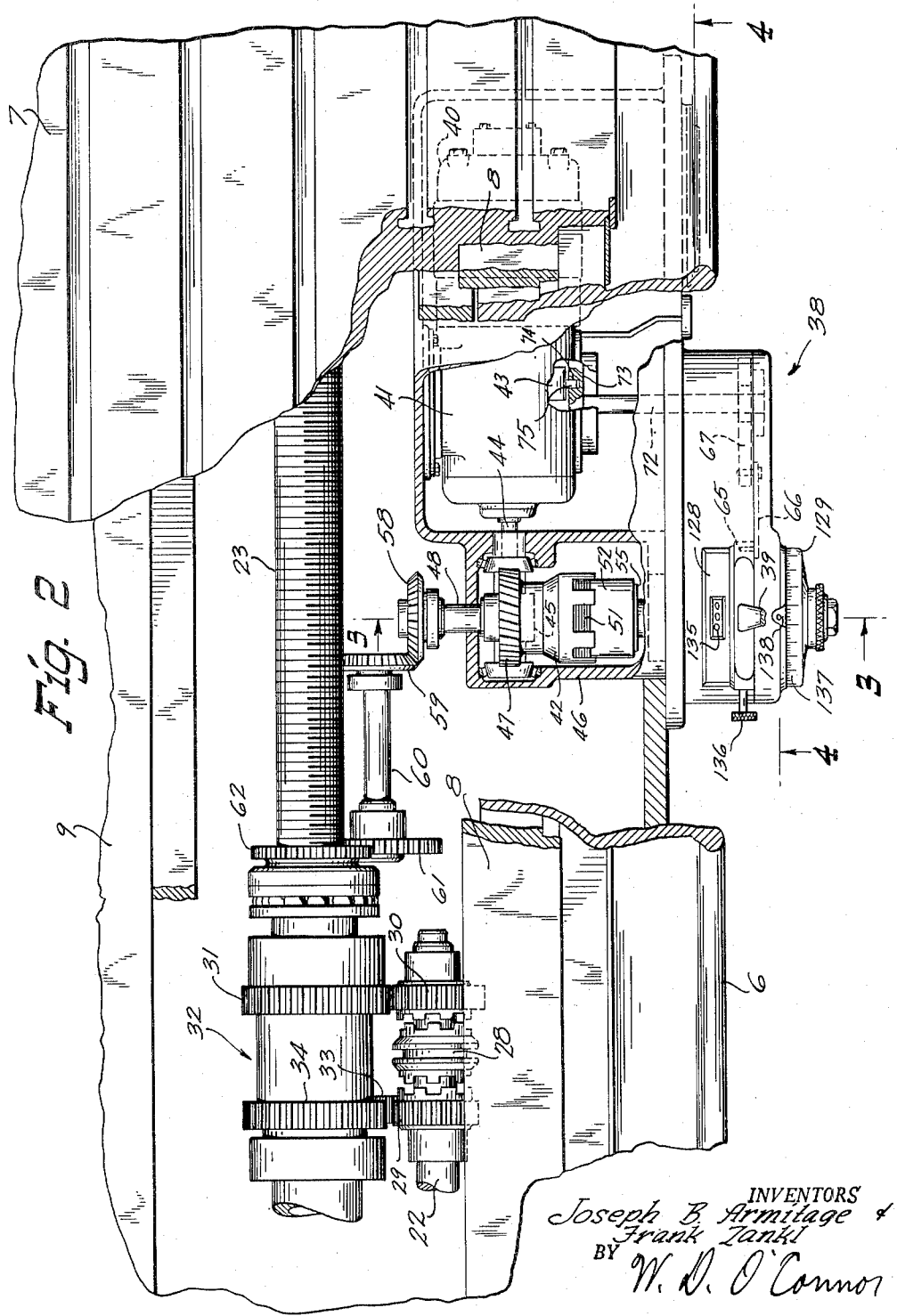
Fig. 2 is a view in horizontal section, taken substantially along the plane of the line 2—2 in Fig. 1 and showing the relative position of the various elements in the auxiliary drive and control mechanism.

The table 7 is reciprocably driven by means of a conventional motor driven rate changing transmission (not shown) contained within the hollow bed 6 at a feed rate predeterminately selected through the positioning of a feed rate selector mechanism 20 conveniently disposed on the front of the bed. Electrical control of the various motors in the machine is afforded from the control panel 21 disposed directly above the selector mechanism 20. The aforementioned transmission is connected with a shaft 22, as shown in Fig. 2, which, in turn, is connected to drive a screw 23 of a conventional screw and nut mechanism. The screw 23 is rotatably journalled at each end in end brackets 24 and 25 fastened to the right and left ends, respectively, of the table 7, as shown in Fig. 1. Thus, the work supporting table 7 may be power driven at any one of a plurality of feed rates, as predeterminately selected by means of the feed selector mechanism 20, or at rapid traverse rate, in the usual well known manner.

Directional control of the movement of the table 7 is afforded through a reversing mechanism shown in Fig. 2. The driving shaft 22 is splined to drive a reverser clutch member 28 intermediate a pair of gears 29 and 30 rotatably journalled on the shaft, at a selected feed rate, or at rapid traverse rate. When the clutch 28 is moved axially to the right to engage clutch teeth on the gear 30, the driving power is transmitted through the gear 30 to a gear 31 meshing therewith to effect rightward movement of the table. The gear 31 constitutes one gear of a gear cluster assembly 32 rotatably journalled in the bed 6 in axial alignment with and keyed to the table screw 23. Since the gear 29 meshes with an idler gear 33, which, in turn, meshes with a second gear 34 on the gear cluster assembly 32, when the clutch 28 is engaged with the clutch teeth on the gear 29, the table screw will be driven to effect power movement of the table 7 to the left. Selective control of the direction and of feed or rapid traverse rate of movement of the table 7 is provided by means of a hydraulic control mechanism similar to that described in the aforementioned Patent No. 2,407,913. Manual operation of the control mechanism is provided through the manipulation of a control handle 35 mounted on the front of the machine, or automatically through the operation of a tripping post (not shown) in conjunction with predeterminately positioned trip dogs (not shown), in a well known manner.

With the aforedescribed mechanism, the table 7 may be driven at either feed or rapid traverse rate during an operating cycle; but when precisely positioning the table for setup purposes, or for various machining operations, it has been usual heretofore to effect movement thereof by the manipulation of a hand crank or handwheel applied to the end of the table screw in a well known manner. This procedure caused the operator to lose considerable time in that he had to go to the end of the table and manipulate the crank to move the table to a desired position, and thereafter return to a vantage point to observe the relative position of the machine tool members. Or if appropriate gearing and shafting was provided for manipulating a crank on the front side of the bed, he still had to expend considerable time and effort slowly cranking the table to a desired position. In certain types of machining operations or while setting up a machining operation, the time lost in accomplishing such table adjustments is considerable.

With the introduction of a secondary or auxiliary drive mechanism 38 into the machine, such as is herein shown and described to exemplify a practical embodiment of the principles of the present invention, such disadvantages are eliminated. The complete control of the machine tool table 7, or other movable member to which the mechanism may be operably connected, is provided at the center of the table whereat the operator can readily observe the relative position between the members. He need only manipulate a single control lever 39 to effectively control the direction and rate of movement of the table. By shifting the position of the lever, he can easily increase or decrease the rate of movement of the table without expending any amount of manual effort and while remaining in a position in which he can readily observe the results of such movement. The secondary drive mechanism 38 is preferably designed as an auxiliary assembly which is retained in an appropriate cavity in the front side of the bed or base 6. Thus, the assembly may be readily removed from the machine to facilitate any repairs or adjustments which may be necessary from time to time.

With the introduction of a secondary or auxiliary drive mechanism, the conventional transmission drive mechanism in a machine tool need not be operated while the machine is being set up. The secondary mechanism is designed to drive the table at any feed rate within the limits of an infinitely variable transmission unit contained therein. The machine operator need only manipulate a single control lever 39, as shown in Fig. 1, in order to effect power operation of the table 7 by means of the secondary drive mechanism 38. For example, the table may be made to move in either direction and at any speed within its range of operation to bring the workpiece 15 within the immediate range of the cutter 16. Thus, considerable time and effort is saved during the setting up operation, in addition, to the reduction in the wear and tear on the conventional drive mechanism. An interlocking control is provided for the auxiliary drive mechanism to prevent its operation when the conventional drive transmission is engaged to effect movement of the table.

As shown in Figs. 2 and 4, the secondary or auxiliary drive mechanism consists primarily of a motor 40 coupled directly with a variable speed transmission 41, which, in turn, is connected by means of a selectively operable clutch mechanism 42 with the table screw and nut drive mechanism 23. The particular variable speed transmission unit 41 shown is an infinitely variable compound planetary friction drive system of standard construction in which a non-rotating traction ring 43, as shown in Fig. 2, engages a pair of tapered rollers (not shown) at varying diameters. The lengthwise adjustment of the traction ring 43 serves to change the speed of an output shaft 44 of the transmission 41. The shaft 44 is keyed to a worm assembly 45 rotatably journalled in a drive mechanism frame 46, as shown in Figs. 2 and 4. The worm 45 meshes with a worm wheel 47, rotatably journalled on a shaft 48, as shown in detail in Fig. 3. A pair of bearings 49 and 50 rotatably support the worm wheel 47 on the shaft 48.

The clutch mechanism 42 serves to connect the worm wheel 47 with the shaft 48 upon the selective engagement of clutch plates 51 therein. Alternate clutch plates are fixedly carried by the worm wheel member 47 and an actuating member 52. Normally, the clutch is resiliently urged to a disengaged position by means of a spring 53 acting between a supporting ring 54, fixedly keyed to the shaft 48 and the axially movable actuating member 52. The disengaging movement of the actuating member 52 is limited by a stop collar 55 carried on the shaft 48. However, when the clutch is to be actuated to an engaged position whereby power is to be transmitted from the worm wheel 47 to the shaft 48, hydraulic fluid is introduced through a shaft passage 56 into an annular hydraulic chamber 57, disposed between the collar 55 and the actuating member 52. The spring 53 serves to force the member 52 rightwardly and exhaust any fluid from the chamber 57 when the clutch is disengaged.

Figure 3:
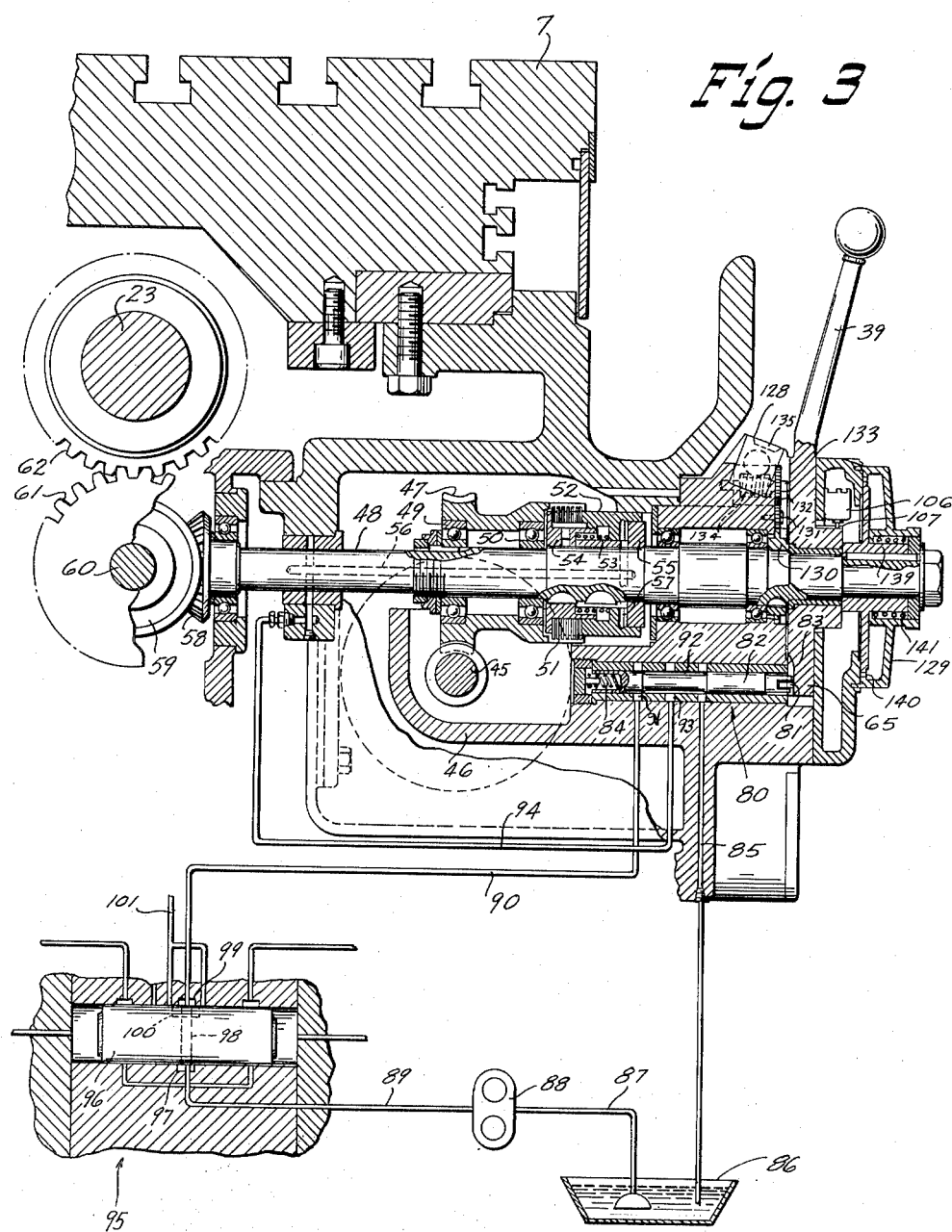
Fig. 3 is a view in vertical section on the plane of the line 3—3 in Fig. 2, showing the details of the hydraulic clutch and the control mechanism therefore, including a schematic diagram of the hydraulic circuit interconnected with the control mechanism for the primary transmission in the machine.

Power from the shaft 48 is transmitted by a pair of bevel gears 58 and 59 to a shaft 60. As shown in Figs. 2 and 3, the shaft 60 is rotatably disposed in the machine base 6 in parallel alignment with the table screw 23. A gear 61, keyed on the other end of the shaft 60, meshes with a gear 62 secured to the gear cluster assembly 32. Thus, power from the motor 40 is transmitted through the variable speed transmission 41, and the shafting and gearing as described, to effect rotation of the table screw 23, whereby the table 7 is power driven at a feed rate determined by the selective adjustment of the transmission 41 and in a direction determined by the direction of rotation of the motor 40.

In order to control the output speed of the infinitely variable transmission 41 and, consequently, the feed rate of the table 7, a single cam control plate 65 integrally formed with the control lever 39, is rotatably mounted on the outward end of the shaft 48. As shown in Figs. 2 and 4, the plate 65 is linked to a linkage or toggle arm 66, which, in turn, is pinned to a gear rack member 67. The rack 67 is slidably disposed in the frame 46 for axial movement therein, so that such movement will effectively rotate a gear 68 mounted on a stub shaft 69. A second gear 70 attached to the gear 68 rotates therewith and is meshed with a gear 71 keyed to the outer end of a shaft 72. As shown in Fig. 2, the shaft 72 extends rearwardly into the housing for the variable speed transmission 41 and has keyed thereto a cam plate 73. A cam groove 74, machined in the inner face of the cam plate 73, is disposed to receive a guide pin 75 mounted in the traction ring 43. The configuration of the cam groove 74 is such that a single rotation of the shaft 72 and cam plate 73 will effect movement of the traction ring 43 through its entire range of travel. Since the position of the traction ring 43 on the tapered rollers (not shown) within the variable speed transmission 41 serves to determine the output speed of the transmission shaft 44, it is evident that the entire output feed range of the transmission 41 can be controlled from the control lever 39.

For example, if the control lever 39 is moved rightwardly from the vertical upright position shown in Fig. 4 to the extreme position A, as indicated by dotted lines, the control plate 65 will be rotated clockwise to effect movement of the linkage arm 66 to a position indicated by the dotted lines 76, and movement of the rack 67 to its extreme left hand position. Such movement of the rack will rotate the cam plate 73, in a manner, to position the traction rings 43 for providing the maximum output speed from the transmission. Any intermediate positioning of the control lever 39 will serve to provide an effective feed rate for driving the table 7 somewhere between zero and the maximum output feed rate, as determined by the operating range of the transmission 41. Likewise, when the control handle 39 is shifted leftwardly to position B, the linkage arm is carried upwardly by the counterclockwise movement of the cam control plate 65 to effect a similar adjustment of the rack 67 and its associated gears to rotate the cam plate 73 through its full range of control. Thus, positions A and B of the control lever 39 both indicate the position of the selective adjustment of the lever for providing the maximum feed rate for the milling machine table drive as obtainable from the secondary drive mechanism 38. Movement of the single control lever in either direction from the upright position therefore serves to effect movement of the machine element in a corresponding direction at a speed which increases in sinusoidal proportion to the distance of movement of the lever from neutral. As will be hereinafter more fully explained, the selected direction of movement of the table 7 is controlled by the operator through the movement of the control lever 39 to either side from the neutral upright position shown in Fig. 4. Such movement serves to electrically reverse the direction of rotation of the motor 40 and, consequently, reverse the direction of rotation of the transmission output shaft 44.

The manual manipulation of the control lever 39 in either direction from the neutral upright position shown in Figs. 1 and 4, serves also to instantaneously actuate the clutch mechanism 42 and effect transmission of power from the secondary drive mechanism 38 to the table screw 23. As long as the lever 39 remains in the neutral position, the clutch 42 will remain disengaged. However, when the lever 39 is moved slightly to the right or left, the cam control plate attached thereto will be rotated clockwise or counterclockwise, respectively, and effect the operation of a hydraulic control valve 80, as shown in Fig. 3.

With the lever 39 in the neutral position, a roller 81 rotatably carried on the end of a piston 82, will be disposed to dwell on a depressed portion of a cam surface 83 on the back side of the control plate 65. A spring 84 resiliently urges the piston roller 81 into continuous contact with the cam surface 83. With the piston 82 in the position shown in Fig. 3, the hydraulic circuit is opened by a return line 85 to a sump 86. Whenever the control lever 39 is manipulated away from the neutral upright position, the piston roller 81 engaging the cam surface 83 will be forced leftwardly from the position shown in Fig. 3 to operate the piston 82 in the control valve 80.

Hydraulic fluid for operating the clutch control system is withdrawn from the sump 86 by a pipe 87 connecting with a continuously operating pump 88. The fluid is pumped through the lines 89 and 90 to a port 91 in the control valve 80. With the piston 82 in the leftward actuated position, the hydraulic fluid will be directed by a central annular groove 92 in the piston from the port 91 to a port 93 connecting with a line 94, which, in turn, connects with the central passageway 56 in the shaft 48. This passageway directs the hydraulic fluid to the chamber 57 and effects operation of the actuating member 52 within the clutch 42 to engage the alternately disposed clutch plates 51 therein. When the clutch is thus engaged, the power is transmitted from the worm wheel 47 to the shaft 48 and, consequently, to the table screw 23, as previously described to effect movement of the table 7.

In order to insure that the clutch 42 will never be engaged to couple the secondary drive mechanism 38 to the table screw when the conventional drive mechanism is already operating, a safety interlock is provided in the hydraulic circuit for the secondary drive mechanism. The interlock is interconnected with the hydraulic control mechanism for the conventional drive mechanism, as more fully shown and described in the aforementioned U. S. Patent No. 2,407,913. In the main control circuit for the conventional machine tool drive mechanism, a reverser valve 95, as shown in Fig. 3, is used to control the direction of table movement. When a piston 96 therein is hydraulically moved from the central position shown in Fig. 3, it serves to permit the completion of a hydraulic circuit which will effect a desired directional movement of a machine tool table or member. However, when the piston is in the central neutral position shown, the conventional drive mechanism is rendered inoperative and the table cannot be driven at feed or rapid traverse rates in either direction. Consequently, to accomplish the interlock aforementioned, the line 89 from the pump 88 is connected with a port 97 in the reverser valve 95. When the piston is in the central or neutral position, this port connects with a diametrically disposed passageway 98 in the piston 96, which, in turn, is then in alignment with a port 99 connecting with the line 90 leading to the hydraulic control valve 80 for the secondary drive mechanism 38. Thus, it is evident that the piston 96 controlling the operation of the conventional drive mechanism is moved in either direction from the central position, it will interrupt the hydraulic supply circuit to the control valve 80 and, consequently, the clutch mechanism 42 in the secondary transmission 38 cannot be engaged even though an operator might manipulate the control lever 39. When the piston 96 is disposed in either of its two activating positions, a recess 100 connecting with the passage 98 in the piston 96, serves to permit hydraulic fluid in the control system to be exhausted via the line 90 and an atmospheric line 101.

As previously mentioned, the direction of table movement is also controlled by the selective manipulation of the lever 39 shown in Figs. 1 and 4, by controlling the direction of rotation of the transmission motor 40. For this purpose, a pair of microswitches 105 and 106, fixedly mounted in the frame 46, are disposed to be operated from a cam 107 integrally formed on the foreside of control plate 65, as shown in Figs. 3 and 4. Both microswitches are of the normally open contact type each having an actuating knob engaged with a depressed portion 108 of the cam 107. As shown in Fig. 4, the depressed portion 108 of the cam 107 extends over the upper left hand quadrant of the circular cam surface. Only when the control lever 39 is positioned in the neutral upright position, are both switches in the normally open position. However, when the operator desires to have the table 7 move rightwardly, it is necessary that he move the lever 39 rightwardly, whereby the actuating knob of the switch 105 will be depressed to close the contacts within that switch. At this time, the actuating knob of the switch 106 remains on the depressed portion 108 of the cam and, consequently, is not rendered electrically operative. Likewise, when the operator shifts the lever 39 leftwardly to obtain leftward movement of the table 7, the cam 107 will be rotated counterclockwise, as viewed in Fig. 4, to close the microswitch 106. At this time, the switch 105 is not actuated, since the actuating button thereof remains on the depressed portion 108 of the cam.

The electrical control circuit in which the microswitches 105 and 106 and the motor 40 are energized, is comparatively simple and compact. Power is obtained from a set of feed lines $L_1$, $L_2$ and $L_3$, which also furnish electricity for the other motors of the machine. The feed line $L_2$ is connected to both of the microswitches 105 and 106 via a line 109. The switch 105 is connected to a line 110, which connects with a solenoid coil 111 in a starting switch 112. The coil 111 is also connected to the line $L_3$. Thus, whenever the normally opened microswitch 105 is closed upon manipulation of the control lever 39 to the right, the circuit will be completed and the coil 111 will be energized to actuate the switch 112. The closure of the starting switch will effect energization of the motor 40, for operation in such direction that the table 7 will be driven rightwardly. When the switch 112 is closed, power from feed line $L_1$, is directed through the line 113 and a closed contact plate 114 to a line 115 connecting with one terminal of the motor 40. At the same time, the power from the feed line $L_2$ is directed through a line 116 and a closed contact plate 117 to a line 118 connecting with another terminal of the motor. The feed line $L_3$ is connected directly to a third terminal of the motor by a line 119. Thus, the motor 40 will continue to be energized to provide rightward table movement as long as the lever 39 remains in any position to the right of neutral.

When the operator manipulates the control lever 39 leftwardly to effect leftward movement of the table 7, the microswitch 106 is actuated immediately through engagement with the cam 107 to permit a current flow from the line 109 to a line 120 connecting with a solenoid coil 121 in a second starting switch 122. Since the coil 121 is also connected to the feed line $L_3$, the closure of the switch 106 permits the energization of the circuit to operatively close the starting switch 122. When the switch 122 is closed, the current from the feed line $L_2$ and the line 116 is directed through a contact plate 123 in the switch 122 to the line 115 connecting with the motor. At the same time, the current from the feed line $L_1$ and the line 113 is carried through a closed switch contact plate 124 to the line 118 connecting with the motor 40. Thus, the phase relationship of the connection between the feed lines $L_1$, $L_2$ and $L_3$ with the motor 40, is changed to effect rotation of the motor in the opposite direction from that previously described and, consequently, causes the table 7 to be driven leftwardly.

With the circumferential length of the depressed portion 108 of the cam 107 on the control plate 65 designed as shown in Fig. 4, it is impossible to effect closure of both of the microswitches 105 and 106 at the same time. Consequently, it would be impossible to energize both of the starting switches 112 and 122 at the same instant. As an added precaution, the starting switches 112 and 122 are mechanically linked in a well known manner to prevent simultaneous closure of the switches. This arrangement serves as a safety feature and yet permits rapid reversal of the motor 40 to effect an almost instantaneous reversal in the direction of table travel. As previously described, when the control lever 39 is manually moved toward the neutral upright position from either direction, the adjustment of the traction ring 43 within the variable speed transmission 41 is varied to reduce the feed rate of the table 7. Consequently, as the lever is shifted from a position calling for rightwardly movement of the table 7 to a position calling for leftwardly movement of the table, or vice versa, the momentum of the table movement is gradually reduced so that at the instant of reversal, the driving load on the motor 40 is almost eliminated.

From the previous description of the secondary or auxiliary drive mechanism 38, it is apparent that the entire operation of the unit is vested in the single control lever 39. Normally, the lever is retained in a neutral position whereat the entire driving mechanism is rendered inoperative. However, when the operator wishes to effect power movement of the table 7 by means of the secondary drive mechanism, he need only shift the lever to either side from the neutral position depending upon the direction of table travel required. The farther the movement of the lever from the neutral position, the faster will be the speed of the shaft 48 and of the table screw 23 driven thereby.

In order to facilitate the precision positioning of the table 7 for setup purposes, a movement indicating means is provided to indicate to the operator the exact amount of movement occurring at a given time. The indicating means provided includes an automatic counter mechanism 128 and a dial assembly 129. The counter mechanism is automatic and is operatively driven from a gear 130 keyed to the shaft 48. The gear 130 meshes with an idler gear 131, which, in turn, meshes with a gear 132 keyed to the end of a shaft 133, as shown in Figs. 3 and 4. A worm and worm wheel 134 connect the shaft 133 with the counter mechanism 128. The counter mechanism is preferably of the three digit type, presenting a dial face 135, as shown in Fig. 2. The dial face permits the operator to readily ascertain the amount of table movement in inches and tenths of inches. As shown in Figs. 1 and 4, a reset button or knob 136 is provided on the counter mechanism 128 and may be selectively clutched therewith to reset the numerical digits on the dial face.

The finer increments of table movement are readily ascertained by reading a dial 129 operatively keyed to the outer end of the shaft 48, as shown in Figs. 2 and 3. The dial 129 bears appropriate indicia 137 which may be read against a zero mark 138 carried on the secondary drive mechanism frame 46. As shown in Fig. 3, the dial assembly 129 is rotatably supported on a pilot member 139 keyed directly to the end of the shaft 48. Serrations 140 on the outer peripheral edge of the pilot member 139 normally mesh with corresponding serrations on an internal diameter of the dial plate 129. Normally a spring 141 retains the dial 129 in the operating position shown in Fig. 3 in which it rotates with the shaft 48. When the operator wishes to reset the dial relative to the shaft, he need only pull the dial unit 129 outwardly against the pressure of the spring 141 to disconnect the serrations 140 and permit the free rotation of the dial relative to the shaft 48. Since both the counter mechanism 128 and the dial assembly 129 are keyed for operation with the shaft 48, they will indicate movement whenever the table 7 is being driven either by the secondary drive mechanism or by the conventional drive mechanism. Thus, the operator can use the movement indicating means at any time with full reliance upon the positioning of the table as indicated by such means.

From the foregoing detailed description of the structure and operation of the illustrative embodiment of the present invention, it will be apparent that a new and improved secondary or auxiliary drive and positioning mechanism has been provided which is especiallly adapted to facilitate the setting up of the larger type machine tools for a desired operating cycle. It should also be apparent that the various operative elements could be electrically, hydraulically or mechanically controlled and operated with equal facility.

Although the illustrative embodiment of the invention has been described in considerable detail for the purpose of making a full disclosure of a practical operative structure, it is to be understood that the various novel features of the invention may be incorporated in other structural forms without departing from the spirit and scope of the invention, as defined in the subjoined claims.

The principles of the invention having now been fully explained in connection with the foregoing description of an illustrative preferred embodying structure, we hereby claim as our invention or discovery:

1. In a machine tool having a base with a movable member slidably mounted thereon, a member positioning device including an infinitely variable transmission unit, a reversible power source to drive said unit, a control means operative to control the reversal of said power source, a drive mechanism disposed to effect feeding movement of said member, a clutch to engage said transmission unit with said drive mechanism, a counter mechanism operably connected to said drive mechanism, an operating lever, a rotatable cam disposed to be manually rotated by said lever, a cam actuated mechanism connected to operate said clutch, a cam operative to actuate said control means and effect selective reversal of said power source, an interconnecting mechanism operative to effect selective adjustment of said infinitely variable transmission, and an indicating dial keyed to said drive mechanism, whereby said movable member may be selectively and precisely positioned in either direction by the manipulation of a single operating lever.

2. An auxiliary positioning mechanism for a sliding element of a machine tool, comprising a driven shaft connected to effect movement of the slidable element, a power driven infinitely variable speed transmission, a clutch interconnecting said transmission with said shaft, a manually operable cam member, a clutch control mechanism operable from said cam member to selectively engage and disengage said clutch, a directional control mechanism operable from said cam member and connected to selectively control the direction of rotation of said transmission, and an infinitely variable speed control mechanism operable from said cam member and connected to selectively vary the output speed of said transmission, whereby the movement, the direction of movement, and the rate of movement of said slidable element may be selectively controlled to position said element.

3. In a machine tool having a member slidably mounted thereon and power driven to reciprocate at one of a plurality of feed rates, a reversible auxiliary drive mechanism of the infinitely variable speed type connected to effect secondary controlled reciprocation of said member, a unitary control mechanism disposed to coordinately and selectively control the power engagement of said auxiliary drive mechanism with said movable member and simultaneously control the rate of movement thereof, a counter device operatively driven from said drive mechanism, and a dial device connected with said drive mechanism, whereby the amount of power movement of said member effected by said auxiliary drive mechanism may be accurately ascertained by reading said counter and said dial mechanism.

4. A secondary drive and positioning mechanism for a machine tool having a power driven member slidably mounted on a base and hydraulically controlled by a hydraulic control means, and comprising a power source, a variable speed transmission driven from said power source, a hydraulically operated clutch mechanism operatively connecting said transmission to drive said machine tool member, a secondary control means operative to engage or disengage said clutch, and a hydraulic interlocking means connecting both of said control means, whereby said secondary drive mechanism is rendered inoperative when said first mentioned hydraulic control means is operatively disposed to effect movement of said power driven member.

5. A secondary drive and positioning mechanism for a machine tool having a base and a movable member slidably mounted on said base and comprising a frame removably mounted in said base, a variable speed transmission mounted in said frame, a motor connected to drive said transmission, a clutch drive mechanism driven by said transmission and connected to effect movement of said member, a control plate rotatably mounted in said frame, a control lever attached to said plate to effect selective positioning thereof, a clutch control cam on said plate, a hydraulic circuit including a control valve operatively disposed to engage said cam and connected to operate said clutch to effect engagement of said clutch and to impart power for moving said member, a motor control cam on said plate, an electrical circuit including switch means operatively disposed to engage said motor control cam and electrically connected with said motor to effect directional rotative control thereof and thereby control the direction of movement of said member, a linkage mechanism connecting said control plate and said variable speed transmission to effectively adjust said transmission and vary the rate of movement of said member, and an indicating means operatively driven from said clutch driving means to precisely indicate the amount of movement of said member, whereby said member may be readily and precisely positioned by the manipulation of a single control lever.

6. In a machine tool having a frame and a member movably mounted on said frame, the combination with mechanism operatively connected to effect power feeding movements of said member, of auxiliary power actuated mechanism selectively operable to effect manually controlled operation of said feeding mechanism for positioning said movable member, said auxiliary mechanism comprising an infinitely variable speed selecting mechanism, a clutch selectively engageable to couple said auxiliary mechanism to said feeding mechanism, a reversible motor selectively operable to drive said auxiliary mechanism in either direction, a manually operable speed and directional control lever arranged to be movable in either direction from a central neutral position and operative to effect actuation of said motor to drive said infinitely variable mechanism in selected direction depending upon the direction of movement and at a speed setting depending upon the distance moved from said neutral position, and control means associated with said lever and operative when said lever is moved in either direction from neutral position to effect engagement of said clutch.

7. A power drive mechanism comprising a frame, a variable speed transmission mounted in said frame, a power source connected to drive said transmission, a clutch driven from said transmission, an output shaft operatively driven through the engagement of said clutch, a control plate rotatably mounted on said output shaft, a control lever attached to said plate to permit selective manipulation of said plate in either direction from a neutral position, a clutch control cam on said plate, a clutch control means operative through engagement with said cam and the movement thereof from said neutral position to effect the actuation of said clutch and the transmission of power to said output shaft, a power source cam on said control plate, a power source control means operative through engagement with said second mentioned cam to control the energization and the direction of rotation of said power source as determined by the direction of movement of said lever from said neutral position, and a transmission control means connectibly operative with said control plate to effectively adjust said variable speed transmission and control the rate of power transmitted through said output shaft as determined by the degree of movement of said control lever from said neutral position with the maximum power output obtainable when said lever is moved the maximum distance from said neutral position.

8. In a machine tool having a frame and a member movably mounted on said frame, mechanism operativly connected to effect feeding movements of said member, main power actuated mechanism selectivly connectible to said feeding mechanism to effect power feeding movements of said member, auxiliary power actuated mechanism selectively connectible to effect manually controlled power operation of said feeding mechanism for positioning said movable member, interlocking control apparatus responsive to connection of said main power actuated mechanism to said feeding mechanism and operative thereupon to prevent simultanous connection of said auxiliary power actuated mechanism to said feeding mechanism, said auxiliary mechanism comprising an infinitely variable speed selecting mechanism, a clutch selectively engageable to connect said auxiliary mechanism to said feeding mechanism, a motor selectively operable to drive said auxiliary mechanism, a manually operable control lever arranged to be movable in either direction from a central neutral position and operative to effect operation of said infinitely variable mechanism at a speed depending upon the distance moved from said neutral position, control means associated with said lever and operative when said main power actuated mechanism is disconnected and upon movement of said lever in either direction from neutral position to effect engagement of said clutch, and motor control apparatus likewise operative when said lever is moved in the one or the other direction from neutral position to effect energization of said motor to operate in direction to effect movement of said movable member in the one or the other direction respectively.

9. In a machine tool having a frame and a member movably mounted on said frame, power operated driving mechanism arranged to effect movement of said member selectively, an auxiliary power operated apparatus for effecting manually controlled movement of said member to position it, said auxiliary apparatus including an infinitely variable speed changing mechanism, a clutch selectively operable to couple said speed changing mechanism to said driving mechanism, an interlocking control mechanism operatively connected with said power operated driving mechanism and arranged to prevent coupling operation of said clutch while said power operated driving mechanism is effecting movement of said member, a power source selectively operable to drive said speed changing mechanism in either direction, a manually operable control device operatively connected to effect adjustment of said speed changing mechanism for operation at selected speed depending upon the extent of movement of said control device in either direction from a central neutral position, and control mechanism operative upon movement of said control device in either direction from said neutral position to effect engagement of said clutch and operation of said power source in the respective direction to cause movement of said movable member in a direction and at a speed selected by manual positioning of said control device.

10. An auxiliary drive and positioning mechanism for a machine tool having a power driven member slidably mounted on a base and selectively controllable via a control means, and comprising a motor, an infinitely variable transmission driven by said motor, a clutch connected to said transmission and operatively connected to drive said member, an auxiliary control means including a single control lever, a clutch actuating mechanism operatively controlled from said auxiliary control means, an interlocking means connecting both of said control means and operative to render said clutch actuating mechanism inoperative under predetermined conditions, a cam actuated mechanism connected for simultaneous operation with said auxiliary control means to selectively adjust said infinitely variable transmission, and switch means operative by said auxiliary control means and electrically connected to reversibly energize said motor depending upon the direction of member travel required.

11. In a machine tool auxiliary positioning mechanism, a base, a movable member slidably mounted on said base, a primary power source and transmission, a screw and nut drive mechanism operatively connected to said transmission and disposed to drive said member, a secondary power source, a variable speed transmission connected to said secondary power source, a clutch driven from said transmission, an output shaft selectively driven upon the actuation of said clutch to drive said screw and nut mechanism, a manually actuatable control means including a control lever to permit selective manipulation of said control means in either direction from a neutral position, a clutch actuating mechanism controlled from said control means to selectively engage said clutch whenever said lever is moved from the neutral position, a switching means actuated upon movement of said auxiliary control lever from the neutral position to directly control the rotation of said power source, a cam actuated linkage mechanism connected to said auxiliary control means and adjustably vary said infinitely variable transmission, and an indicating means connectibly driven from said output shaft to precisely indicate the position of said member whereby said auxiliary positioning mechanism serves to permit the selective operation of said movable member in either direction at a variable feed rate and precision positioning of said member as readily ascertainable by said indicating means without utilizing said primary feed transmission.

12. In a milling machine; a frame; a support slidably carried by said frame for rectilinear movement in either direction; a feed drive train connected to drive said support at a selected feeding rate; an auxiliary drive mechanism connectible to drive said support independently of said feed drive train for effecting accurate positioning movement thereof; said auxiliary drive mechanism comprising three principal members including a reversibly energizable motor, an infinitely variable speed transmission driven by said motor, and a selectively engageable disconnect clutch for coupling said transmission to drive said support; and a single control lever operatively connected to effect a simultaneous and coordinated control of the said principal members constituting said auxiliary drive mechanism for accurately positioning said support relative to said frame.

13. In a machine tool having a slidable support carried for rectilinear movement in either direction; power operable means selectively connectible to drive said support in either direction at a selected feeding rate; a reversibly operative variable speed transmission connectible to drive said support in either direction; a selectively engageable disconnect clutch arranged to connect said variable speed transmission for driving said support independently of said power operable means; and a selectively movable single control lever coordinately connected to effect a simultaneous engagement of said clutch, a selectively reversible operation of said variable speed transmission, and a selectively varying output rate of said variable speed transmission whereby the said single control lever is adapted to precisely control the rate and direction of movement of said support to effect accurate positioning movement thereof.

References Cited in the file of this patent
UNITED STATES PATENTS

| | | |
|---|---|---|
| 2,080,152 | Schmitter | May 11, 1937 |
| 2,110,173 | Pohl et al. | Mar. 8, 1938 |
| 2,110,958 | Lindner | Mar. 15, 1938 |
| 2,203,743 | Parsons | June 11, 1940 |
| 2,221,574 | Chladek | Nov. 12, 1940 |
| 2,293,733 | Guttmann | Aug. 25, 1942 |
| 2,327,109 | Hirsch | Aug. 17, 1943 |
| 2,344,529 | Armitage | Mar. 21, 1944 |
| 2,353,136 | Bade | July 11, 1944 |
| 2,400,815 | Forman | May 21, 1946 |
| 2,404,439 | Hirsch | July 23, 1946 |
| 2,416,539 | Nenninger et al. | Feb. 25, 1947 |
| 2,464,986 | Miller | Mar. 22, 1949 |
| 2,466,198 | Berthiez | Apr. 5, 1949 |
| 2,546,913 | Trosch et al. | Mar. 27, 1951 |